United States Patent [19]

Lee

[11] 4,132,386

[45] Jan. 2, 1979

[54] VALVE MECHANISM FOR A CONTROL VALVE

[76] Inventor: Eugene O. Lee, 6611 Sea Side Walk, Long Beach, Calif. 90802

[21] Appl. No.: 826,862

[22] Filed: Aug. 22, 1977

[51] Int. Cl.² .............................................. F16K 1/44
[52] U.S. Cl. ................................... 251/171; 251/191; 251/210; 251/DIG. 1
[58] Field of Search ................. 251/333, DIG. 1, 210, 251/171, 191

[56] References Cited

U.S. PATENT DOCUMENTS

| | | | |
|---|---|---|---|
| 1,197,583 | 9/1916 | Sheridan | 251/333 |
| 1,954,044 | 4/1934 | Guildford | 251/210 |
| 2,782,800 | 2/1957 | Hillebrand | 251/333 X |
| 2,927,767 | 3/1960 | Ray | 251/210 |

*Primary Examiner*—Arnold Rosenthal
*Attorney, Agent, or Firm*—W. Edward Johansen

[57] ABSTRACT

The invention is an improved valve mechanism for controlling the flow in conduit to be used in combination with an adjustable valve. The adjustable valve includes a T-shaped valve body having a first bore extending therethrough and a second bore adjacent to the first bore. The adjustable valve also includes a stem having an inner end and an axially outer end which extends through one of the ends of the first bore and a device for forming a seal between the first bore and the stem. The valve mechanism includes a cylindrically shaped sealing member having a bore axially aligned with the first bore of the valve body and being disposed within the first bore adjacent to the end thereof oppositely disposed from the stem. The sealing member has a cylindrical inner sidewall and a truncated-conical outer sidewall adjacent to its top portion and a cylindrical outer sidewall adjacent to its bottom portion. The valve mechanism also includes a cylindrically shaped valve member which is adapted to slideably engage around the outer cylindrical sidewall of the sealing member and which is mechanically coupled to the stem so that its inner sidewall may travel along and adjacent to the outer sidewall of the sealing member.

2 Claims, 4 Drawing Figures

VALVE MECHANISM FOR A CONTROL VALVE

BACKGROUND OF THE INVENTION

1. Field of the Invention

The present invention relates to a control valve and more particularly to a control valve with an improved valve mechanism that includes a new valve member and seating member arrangement.

2. Description of the Prior Art

U.S. Pat. No. 2,684,688, entitled Automatic Valve and System, issued to Homer G. Thornhill on July 27, 1954, teaches a valve that includes a valve body having a threaded inlet adapted to be connected to a side arm of a Christmas tree manifold. The valve body also has a flanged outlet adapted to be connected to a positive choke from which leads the pipe line going to the storage tank. The valve body is in the shape of a T, the inlet being at the base of the T, and the outlet being in one of the arms of the T. Through the other arm of the T projects a valve stem on which is mounted the valve which cooperates with a removable valve seat threadedly supported within the outlet. The valve stem is slidably supported within the center of the arm of the T opposite the outlet by means of a flanged valve bonnet. The valve bonnet is sealed to the end of the valve body by means of a ring gasket and is secured thereto by means of a fast coupling.

The valve bonnet is provided with two cylindrical bearings for supporting the cylindrical valve stem. Within each of the two annular grooves and within the bearings there is mounted a neoprene O-ring disposed between a pair of leather non-extrusion rings. These form a pair of spaced sliding seals between the valve stem and the valve bonnet.

Other patents include U.S. Pat. No. 3,166,092, U.S. Pat. No. 2,227,297, U.S. Pat. No. 2,684,689, U.S. Pat. No. 3,049,140 and U.S. Pat. No. 3,166,093. All of these patents teach valves which have valve members which are conically shaped and which are adapted to be inserted into a valve seat or sealing member. These types of valves are generally referred to as needle and seat of valves. The interface between the surface of the valve member and the surface of the valve seat serves not only to control the flow through the valve itself, but also serves as the shutoff when the valve is closed. This interface is therefore subject to wear. Furthermore an additional purpose of the valve is to decrease pressure pressure across the controlled orifice due to fluid flow. The pressure decrease is dependent on the degree that the orifice is opened. Another problem with the valve is that its resilient seal is set by the pressure within it.

SUMMARY OF THE INVENTION

In view of the foregoing factors and conditions characteristic of the prior art it is a primary object of the present invention to provide an improved valve mechanism for an adjustable valve which reduces the wear at the interface between the valve member and the valve seat thereof.

It is another object of the present invention to provide an adjustable valve that can mechanically set its resilient seal.

It is still another object of the present invention to provide a valve mechanism for an adjustable valve that creates a back pressure thereon because the fluid flow impinges upon itself.

In accordance with an embodiment of the present invention an improved valve mechanism for controlling the flow in conduit to be used in combination with an adjustable valve is described. The adjustable valve includes a T-shaped valve body having a first bore extending therethrough and a second bore adjacent to the first bore. The adjustable valve also includes a stem having an inner end and an axially outer end which extends through one of the ends of the first bore and a device for forming a seal between the first bore and the stem. The valve mechanism includes a cylindrically shaped sealing member having a bore axially aligned with the first bore of the valve body and being disposed within the first bore adjacent to the end thereof oppositely disposed from the stem. The sealing member has a cylindrical inner sidewall and a truncated-conical outer sidewall adjacent to its top portion and a cylindrical outer sidewall adjacent to its bottom portion. The valve mechanism also includes a cylindrically shaped valve member which is adapted to slideably engage around the outer cylindrical sidewall of the sealing member and which is mechanically coupled to the stem so that its inner sidewall may travel along and adjacent to the outer sidewall of the sealing member.

The features of the present invention which are believed to be novel are set forth with particularity in the appended claims.

Other objects and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
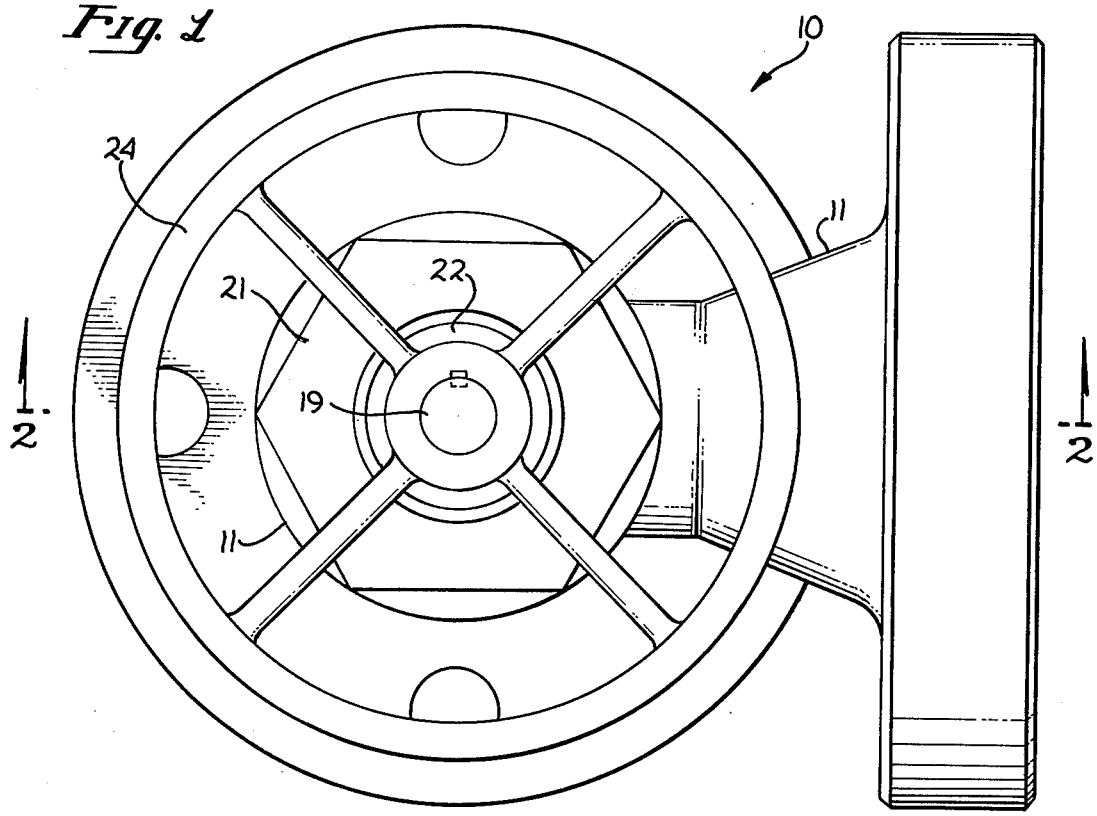
FIG. 1 is a top plan view of an adjustable valve which has an improved valve mechanism for controlling the flow therein and which has been constructed in accordance with the principles of the present invention.
Figure 2:
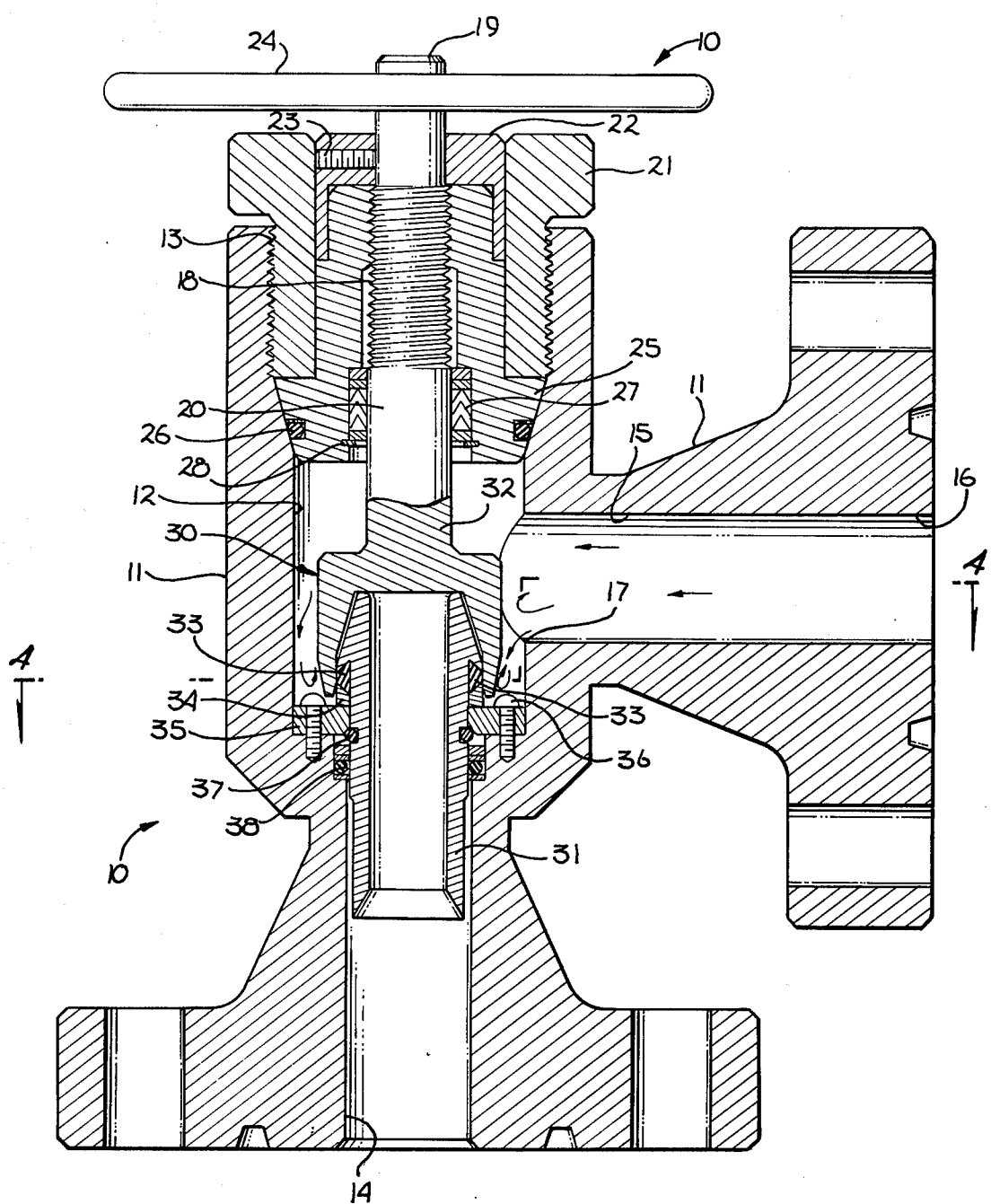
FIG. 2 is a cross-sectional view of the adjustable valve of FIG. 1 taken along line 2—2 showing the valve mechanism in its closed position.

In order to best understand the present invention it is necessary to first consider the elements of the preferred embodiment thereof that are common to all adjustable valves. In FIG. 1 an adjustable valve 10 includes a valve body 11. In FIG. 2 the valve body 11 includes a first bore 12 extending therethrough and having a first threaded open end 13 and a second open end 14 and a second bore 15 having a first open end 16 and a second open end 17 and having its tranverse axis axially aligned with a radius of the first bore 12. The adjustable valve 10 also includes a stem 18 having a first end 19 and a second end 20 and being disposed within the first bore 12 with the first end 19 extending through the first threaded open end 13 thereof.

Still referring to FIG. 2, a sealing device for forming a seal between the first threaded open end 13 of the first bore 12 and the stem 18 includes a threaded collar 21 which is mechanically coupled to the first threaded open end 13 of the first bore 12 and which has a bore axially aligned with the first bore 12 and a bushing 22 which is secured by a set screw 23 and which is mechanically coupled to the stem 18 and adapted to travel along the longitudinal axis of the first bore 12 adjacent to the threaded collar 21. The sealing device also includes a circular wheel 24 which is mechanically coupled to the stem 18 a portion of which is threaded and a threaded member 25 which is adapted to be slideably engaged within the threaded collar 21 and mechanically sealed by a rubber O-ring 26 disposed the first bore 12 and the outer sidewall thereof. The threaded member 25 is adapted to receive the threaded portion of the stem 18. The sealing device further includes a stem seal 27 which is disposed about the stem 18 and a snap ring 28 which retains the stem seal 27 within the first bore 12.

Figure 3:
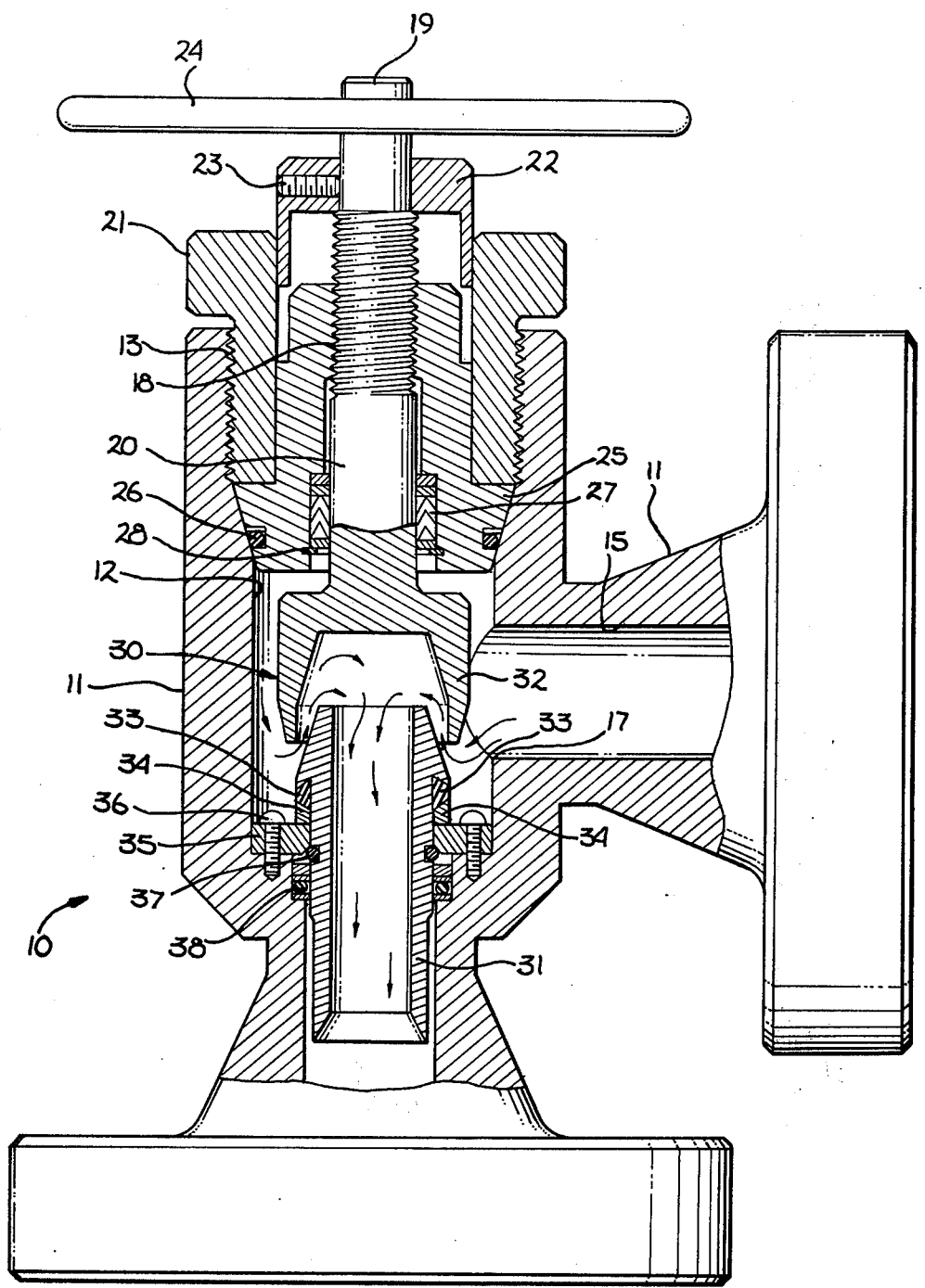
FIG. 3 is a cross-sectional view of the adjustable valve of FIG. 1 taken along line 2—2 showing the valve mechanism in its opened position.

Referring to FIG. 3 in conjunction with FIG. 2 the adjustable valve 10 further includes a valve mechanism 30 which includes a sealing member 31 of a substantially cylindrical shape which is axially aligned with the first bore 12 of the valve body 11 and which slideably disposed therewithin adjacent to the second open end 14 thereof. The sealing member 31 has a cylindrically shaped inner sidewall and a truncated-conical outer sidewall adjacent to its top portion and a cylindrically shaped outer sidewall adjacent to its bottom portion. The valve mechanism 30 also includes a valve member 32 of a cylindrical shape which is adapted to slideably engage around the cylindrically shaped outer sidewall of the sealing member 31 and which is mechanically coupled to the second end 20 of the stem 18 so that it may move along the outer sidewall of the sealing member 31.

Figure 4:
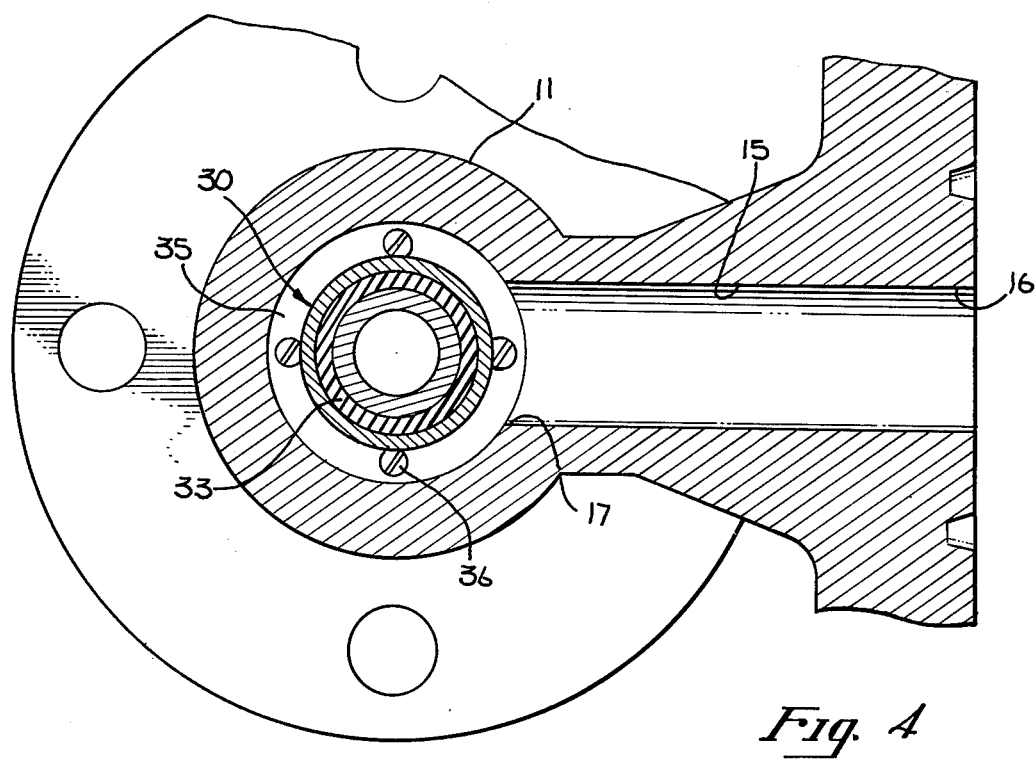
FIG. 4 is a transverse, cross-sectional view of the adjustable valve of FIG. 1 taken along line 4—4.

Referring to FIG. 4 in conjunction with FIG. 2 the valve mechanism 30 further includes a resilient seal 33 which is disposed adjacent to the outer sidewall of the sealing member 31, a compression ring 34 which secures the resilient seal in place and a retainer ring 35 which is secured by a set of four screws 36 to the valve body 11 and which blocks the compression ring 34 from any further sliding toward the second end 14 of the first bore 12 while the sealing member 31 compresses the resilient seal 33 so that it is forced into the interface of inner sidewall of the valve member 32 and the outer sidewall of the sealing member 31 thereby mechanically setting the resilient seal 33 of the valve mechanism 30. A snap ring 37 holds the sealing member 31 in place and a rubber O-ring 38 forms between the first bore 12 of the valve body 11 and the sealing member 31.

In operation the adjustable valve 10 has the first end 16 of the second bore 15 mechanically coupled to a conduit and has it functioning as an inlet for a fluid flow. The adjustable valve 10 also has the second end 14 of the first bore 12 mechanically coupled to a conduit and has it functioning as an outlet for the fluid flow. The fluid flows through the second bore 15 into the orifice created by the interface of the sealing member 31 and the opened valve member 32 as shown in FIG. 3. The fluid flow impinges onto itself thereby creating a back pressure which is desirable. If the valve member 32 is closed as shown in FIG. 2 then the valve member 32 presses downward onto the sealing member 31 forcing it downward so that the resilient seal 33 is mechanically set. This is an advantage over the needle and choke valves taught by the prior art because in these valves the sealing interface is metal to metal.

From the foregoing it can be seen that improved valve mechanism for use in combination with a standard adjustable valve has been described. The valve mechanism includes a valve member and a sealing member which operates in conjunction with others to create back pressure within the adjustable valve by impinging the fluid flow onto itself and to mechanically set a resilient seal thereby eliminating the metal to metal sealing interfaces which are present in the prior art valve mechanisms.

Accordingly it is intended that the foregoing disclosure and showing made in the drawing shall be considered only as an illustration of the present invention. Furthermore it should be noted that the sketches are not drawn to scale and that distances of and between the various figures are not to be considered significant. The invention will be set forth with particularity in the appended claims.

What is claimed is:

1. An improved valve mechanism for controlling the flow in a conduit to be used in combination with an adjustable valve which includes:
   a. a valve body having a first bore with a first open end and a second open end extending therethrough, the valve also having a second bore with a first open end and a second open end adjacent to and perpendicular to the first bore, the second bore has its transverse axis axially aligned with the radius of the first bore, the first open end of the second bore functions as an inlet and is mechanically coupled to the conduit and the second open end of the first bore functions as an outlet and is mechanically coupled to the conduit;
   b. a stem having an inner end and an axially outer end which extends through the first open end of the first bore; and
   c. a device forming a seal between the first open end of the first bore and the stem, said improved valve mechanism comprising:
      a. a cylindrical sealing member having a bore axially aligned with the first bore of the valve body, said cylindrical sealing member being slideably engaged within the first bore of the valve body adjacent to the second open end thereof, said cylindrical sealing member having a cylindrical inner sidewall and a truncated-conical outer sidewall adjacent to its top portion and a cylindrical outer sidewall adjacent to its bottom portion;
      b. a cylindrical valve member which is adapted to slideably engage around said outer cylindrical sidewall of said sealing member, which is mechanically coupled to the stem so that its inner sidewall may travel adjacent to and along said outer sidewall of said sealing member, whereby the flow travels between said truncated-conical outer sidewall of said cylindrical sealing member and said inner sidewall of said cylindrical valve member in order that the flow may impinge upon itself; and
      c. sealing means for forming a seal between said sealing member and the first bore of the valve body, wherein said sealing means is a compressible and resilient member which is mechanically pressed against the inner sidewall of the first bore of the valve body when said cylindrical valve member presses down against the top of said cylindrical sealing member in order to mechanically set said sealing means thereby providing a tight seal.

2. An improved valve mechanism for controlling the flow in a conduit to be used in combination with an adjustable valve according to claim 1 wherein said sealing means is a ring disposed around said outer sidewall of said sealing member and a rubber o-ring also disposed around said outer sidewall adjacent to said ring.

* * * * *